United States Patent
Paura et al.

(10) Patent No.: US 9,850,674 B1
(45) Date of Patent: Dec. 26, 2017

(54) VERTICAL JOINT ASSEMBLY FOR WIND TURBINE TOWERS

(71) Applicant: General Electric Company, Schenectady, NY (US)

(72) Inventors: Ingo Paura, Meppen (DE); Stefan Voss, Lingen (DE); Martin Schmitt, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/292,282

(22) Filed: Oct. 13, 2016

(51) Int. Cl.
| | |
|---|---|
| *E04H 12/08* | (2006.01) |
| *E04B 1/41* | (2006.01) |
| *E04H 12/34* | (2006.01) |
| *F03D 13/20* | (2016.01) |

(52) U.S. Cl.
CPC ............ *E04H 12/085* (2013.01); *E04B 1/40* (2013.01); *E04H 12/342* (2013.01); *F03D 13/20* (2016.05)

(58) Field of Classification Search
CPC ..... E04H 12/00; E04H 12/085; E04H 12/342; E04B 1/40; F03D 13/20
See application file for complete search history.

(56) References Cited

U.S. PATENT DOCUMENTS

| | | | | |
|---|---|---|---|---|
| 1,265,966 A | * | 5/1918 | Schlafly | B65D 90/08 405/153 |
| 1,765,943 A | * | 6/1930 | Schmidt | H01K 1/465 403/320 |
| 3,193,129 A | * | 7/1965 | Pfluger | B65D 88/005 220/233 |
| 6,715,243 B1 | * | 4/2004 | Fons | E04H 7/30 220/4.12 |
| 8,590,276 B2 | * | 11/2013 | Kryger | E04H 12/085 403/334 |
| 9,677,543 B2 | * | 6/2017 | Kamibayashi | F03D 13/10 |
| 2006/0272244 A1 | | 12/2006 | Jensen | |
| 2010/0126079 A1 | * | 5/2010 | Kristensen | B25B 13/02 52/40 |
| 2011/0232071 A1 | * | 9/2011 | Knoop | B25B 23/14 29/525.02 |

(Continued)

FOREIGN PATENT DOCUMENTS

DE 19832921 A1 2/2000

*Primary Examiner* — Jessica Laux
(74) *Attorney, Agent, or Firm* — Dority & Manning, P.A.

(57) ABSTRACT

The present disclosure is directed to a tower assembly of a wind turbine having a joint assembly configured therein. The tower assembly includes at least one generally cylindrical tower section. The tower section is split into at least a first vertical tower section and a second vertical tower section. Each of the first and second vertical tower sections define an interior wall and an exterior wall separated by a thickness. Further, the tower assembly includes a joint assembly that secures the first and second vertical tower sections together. The joint assembly includes a first L-flange mounted to the interior wall of the first vertical tower section and a second L-flange mounted to the interior wall of the second vertical tower section. The first L-flange faces in a first direction and the second L-flange faces away from the first direction. Further, the first and second L-flanges are separated from the interior walls of the first and second vertical tower sections via an open space.

8 Claims, 7 Drawing Sheets

(56) References Cited

U.S. PATENT DOCUMENTS

| | | | |
|---|---|---|---|
| 2013/0000241 A1* | 1/2013 | Jensen | E04H 12/085 52/651.01 |
| 2013/0115054 A1* | 5/2013 | Yokoyama | F03D 13/20 415/126 |
| 2014/0230343 A1* | 8/2014 | Lam | E04H 12/085 52/40 |
| 2014/0237932 A1* | 8/2014 | Moestrup | E04H 12/342 52/651.01 |

* cited by examiner

VERTICAL JOINT ASSEMBLY FOR WIND TURBINE TOWERS

FIELD OF THE INVENTION

The subject matter disclosed herein relates generally to wind turbines, and more particularly to vertical joint assemblies for segmented wind turbine towers.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

As the sizes of wind turbines generally increase, the towers of the wind turbines may be modified to accommodate these increases. For example, as the tower height increases, it is common to provide a tower formed from a plurality of horizontal segments stacked vertically atop one another. In addition, the tower may also be segmented into one or more vertical tower segments such that the diameter of the tower can be increased as well. As such, the tower segments can be manufactured in a facility, transported to a wind turbine site, and then joined together to form the tower. Accordingly, the wind turbine tower segments can be designed to fit within standard shipping dimensions so as to minimize the cost of transporting such segments to the wind turbine site, while also allowing for towers with increased heights.

As it is known in the art to divide the tower into one or more horizontal and/or vertical segments depending on the required dimensions of the tower and shipping limitations, the art is continuously seeking new and improved joint assemblies for securing such segments together.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a tower assembly of a wind turbine. The tower assembly includes at least one generally cylindrical tower section. The tower section is split into, at least, a first vertical tower section and a second vertical tower section. Each of the first and second vertical tower sections define an interior wall and an exterior wall separated by a thickness. Further, the tower assembly includes a joint assembly configured for securing the first and second vertical tower sections together. The joint assembly includes a first L-flange mounted to the interior wall of the first vertical tower section and a second L-flange mounted to the interior wall of the second vertical tower section. The first L-flange faces in a first direction and the second L-flange faces away from the first direction. Further, the first and second L-flanges are separated from the interior walls of the first and second vertical tower sections via an open space.

In one embodiment, the first and second L-flanges are mounted to the interior walls of the first and second vertical tower sections via one or more first fasteners that extend from the first and second L-flanges into the open space and through at least a portion of the thicknesses of the first and second vertical tower sections, respectively. In another embodiment, the first and second L-flanges each include a slotted opening configured to receive the one or more first fasteners. As such, the slotted openings are configured to allow for adjusting a circumferential position of the L-flanges. In addition, each of the first fasteners may include a threaded stud welded to the first and second L-flanges and a maintenance-free nut secured to the threaded stud.

In further embodiments, the joint assembly may further include a bushing configured with each of the one or more first fasteners in the open space. In such embodiments, each of the first fasteners may extend through the bushings and through the thicknesses of the first and second vertical tower sections, respectively. Thus, the first fasteners may be further secured via a maintenance-free nut configured on the exterior surfaces of the first and second vertical tower sections.

In additional embodiments, the first and second L-flanges may be joined to each other via one or more second fasteners. More specifically, in certain embodiments, each of the second fasteners may include a maintenance-free bolt and a maintenance-free nut.

In yet another embodiment, the first and second L-flanges may be arranged in a spaced apart relationship so as to define a vertical gap therebetween. In such embodiments, the joint assembly may further include a filler or spacer plate configured within the vertical gap.

In still further embodiments, the tower assembly may include a plurality of tower sections stacked end-to-end atop one another and coupled together to form the tower. In such embodiments, each of the plurality of tower sections may include at least one flange that can be coupled to an adjacent tower section.

In another aspect, the present disclosure is directed to a joint assembly for securing vertical tower sections together. The joint assembly includes a first L-flange configured for mounting to an interior wall of a first vertical tower section. Further, the first L-flange includes a first slotted opening. The joint assembly also includes a second L-flange configured for mounting to an interior wall of a second vertical tower section. The second L-flange includes a second slotted opening. The joint assembly further includes a plurality of first fasteners secured to the first and second L-flanges through the first and second slotted openings, respectively. The first and second L-flanges are secured together in opposite directions. Further, the first and second slotted openings configured to allow for adjusting a circumferential position of the L-flanges. Moreover, the first fasteners are configured for mounting the first and second L-flanges to the interior walls of the first and second vertical tower sections, respectively. It should be understood that the joint assembly may further include any of the additional features as described herein.

In yet another aspect, the present disclosure is directed to a method for forming a tower assembly of a wind turbine. The method includes providing a plurality of pre-fabricated joint assemblies, with each joint assembly having a first L-flange secured to a second L-flange in opposite directions. Further, the first and second L-flanges each have a slotted opening. The method also includes aligning a plurality of vertical tower sections at a plurality of joint locations to form the tower assembly. Further, the method includes mounting, via one or more first fasteners through the slotted openings, the first and second L-flanges to adjacent interior walls of the vertical tower sections, respectively, at each joint location so as to secure the vertical tower sections together. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
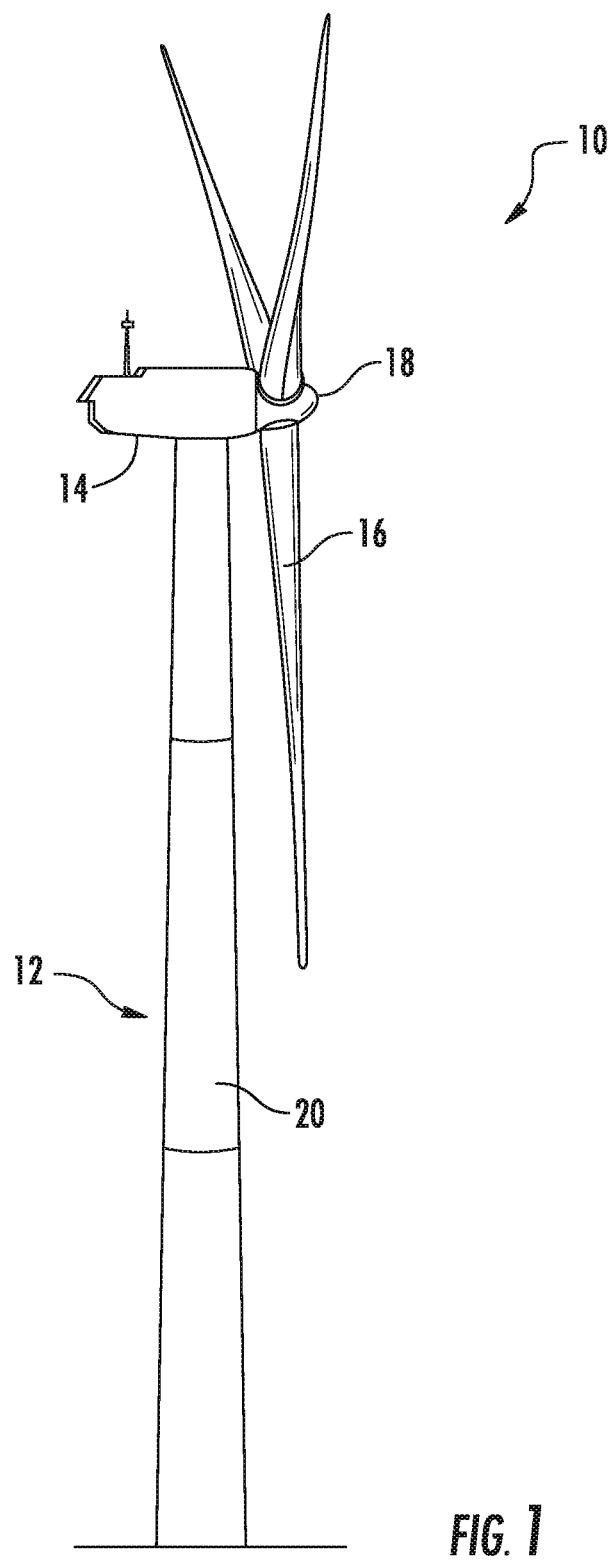
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates one embodiment of a wind turbine 10 according to the present disclosure. As shown, the wind turbine 10 includes a tower 12 (also referred to herein as a tower assembly) with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
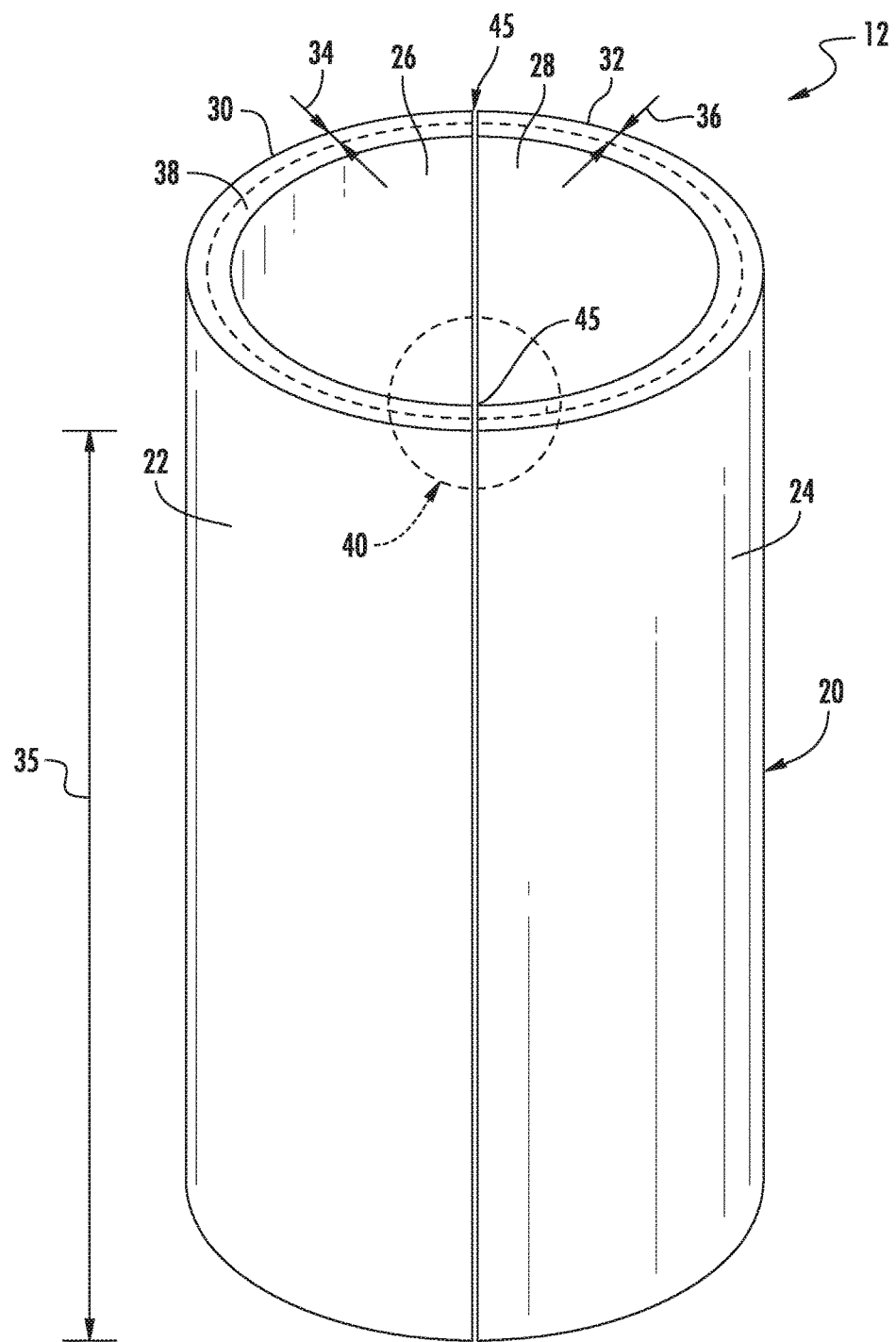
FIG. 2 illustrates a perspective view of one embodiment of a tower assembly according to the present disclosure.

As further shown in FIG. 1, the tower assembly 12 according to the present disclosure may be formed from a plurality of tower sections 20. For example, as shown, each of the plurality of tower sections 20 may be disposed adjacent and coupled to another of the plurality of tower sections 20 to at least partially form the tower 12. More specifically, as shown in FIG. 1, a plurality of tower sections 20 may be stacked end to end to form the tower 12. Further, as shown in FIG. 2, each of the tower sections 20 may include a flange 38 or a plurality of flanges 38 configured to couple adjacent tower sections 20 together. The flanges 38 may be configured to couple the tower section 20 to an adjacent tower section 20. For example, as shown in FIG. 2, each flange 38 may be disposed at an end of the tower section 20. In certain embodiments, the flange 38 may define a plurality of bore holes (not shown) spaced generally circumferentially about the flange 38. As such, the bore holes may be configured to accept a mechanical fastener, such as a nut and bolt combination, a rivet, a screw, or any other suitable mechanical fastener, therethrough. To couple the tower section 20 to an adjacent tower section 20, the flange 38 may be mated with an adjacent flange 38 of the adjacent tower section 20, and the bore holes of the mating flanges 38 aligned. Mechanical fasteners may be placed through at least a portion of the mating bore holes to couple the tower sections 20 together. It should be understood, however, that the present disclosure is not limited to tower sections 20 having flanges 38 as described above, and rather that any suitable fastening device or method may be utilized to couple the tower sections 20 together. In further embodiments, the tower sections 20 may be formed from a suitable metal or metal alloy, such as carbon steel. Alternatively, however, the tower sections 20 may be formed from any suitable materials, such as, for example, various suitable composite materials.

Referring now to FIG. 2, a perspective view of one embodiment of a tower assembly 12 of a wind turbine 10 is illustrated according to the present disclosure. As shown, the tower assembly 12 may include at least one generally cylindrical tower section, such as one of the tower sections 20 illustrated in FIG. 1. For example, the cross-sectional shape of the tower section 20 may be generally circular or oval. Further, in some embodiments, the cross-sectional shape of the tower section 20 may be generally polygonal, having a plurality of sides such that the polygonal cross-section approximates a generally circular or oval cross-section.

It should be understood that the cross-sectional area of the tower section 20 may remain constant or may taper through a height 35 of the tower section 20 or portions thereof. For example, in some embodiments, the cross-sectional area of each of the tower sections 20 may decrease through the height 35 or a portion thereof. Further, it should be understood that the tower sections 20 may all taper or may all have generally constant cross-sections, or one or more of the tower sections 20 may taper while other of the tower sections 20 may have generally constant cross-sections.

Referring generally in FIGS. 2-8, the tower section 20 may be split into a plurality of vertical tower sections 22, 24. More specifically, as shown in the illustrated embodiment, the tower section 20 is split into two vertical tower sections, namely, a first vertical tower section 24 and a second vertical tower section 26. In further embodiments, the tower assembly 12 may be split into more than two vertical tower sections, such as three or four vertical tower sections. Further, as shown, each of the first and second vertical tower sections 22, 24 defines an interior wall (designated as 26 and 28, respectively) and an exterior wall (designated as 30 and 32, respectively) separated by a thickness (designated as 34 and 36, respectively). The interior walls 26, 28 and the exterior walls 30, 32 may each be generally cylindrical, as discussed above with regard to the tower section 20 in general. Moreover, the tower section 20 generally defines a height 35.

Still referring to FIGS. 2-8, the tower assembly 12 also includes at least one joint assembly 40 configured at a joint location 45 between the first and second vertical tower sections 22, 24 so as to secure the vertical tower sections 22, 24 together. More specifically, as shown in FIGS. 3-8, the joint assembly 40 includes a plurality of flanges 42, 44. For example, as shown, the flanges 42, 44 include, at least, a first L-flange 42 mounted to the interior wall 26 of the first vertical tower section 24 and a second L-flange 44 mounted to the interior wall 28 of the second vertical tower section 26. The L-flanges 42, 44 described herein may be any suitable flanges now known or later developed in the art and may be constructed of any suitable material. For example, in one embodiment, the L-flanges may be constructed or a metal or metal alloy, such as steel. In addition, an L-flange generally refers to a flange having an "L" shape or a 90-degree-angle shape.

Further, as shown, the first L-flange 42 faces in a first direction 46 and the second L-flange 44 faces away from or opposite of the first direction 46 in a second direction 48. In addition, as shown in the illustrated embodiments, the first and second L-flanges 42, 44 are separated from the interior walls 26, 28 of the first and second vertical tower sections 22, 24 via an open space 50. By providing a space between the first and second L-flanges 42, 44 and the first and second vertical tower sections 22, 24, standard L-shaped flanges can be utilized (i.e. flanges without curvature) since the flanges 42, 44 do not sit flush against the interior walls 26, 28 of the first and second vertical tower sections 22, 24.

Figure 3:
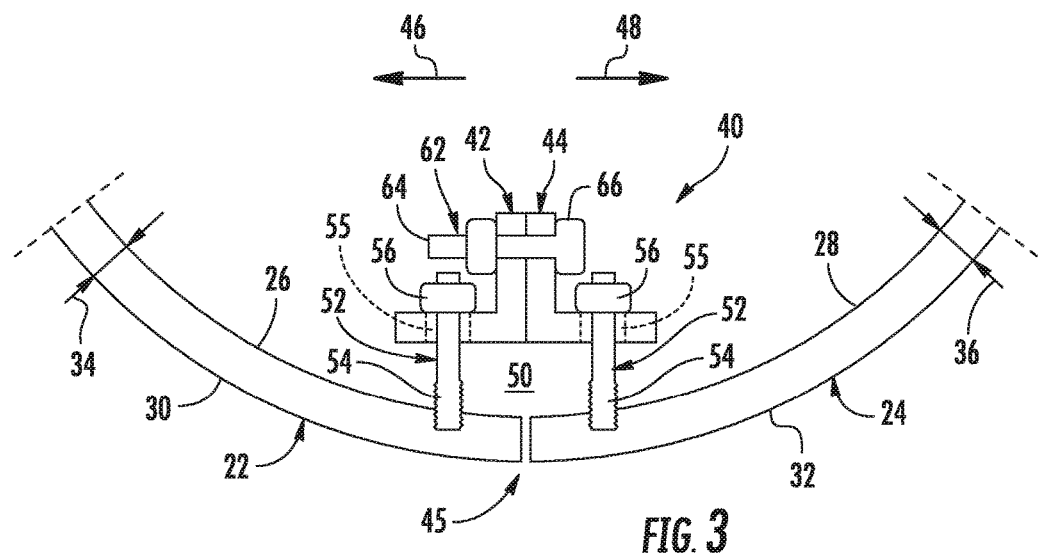
FIG. 3 illustrates a top view of one embodiment of a joint assembly according to the present disclosure.
Figure 6:
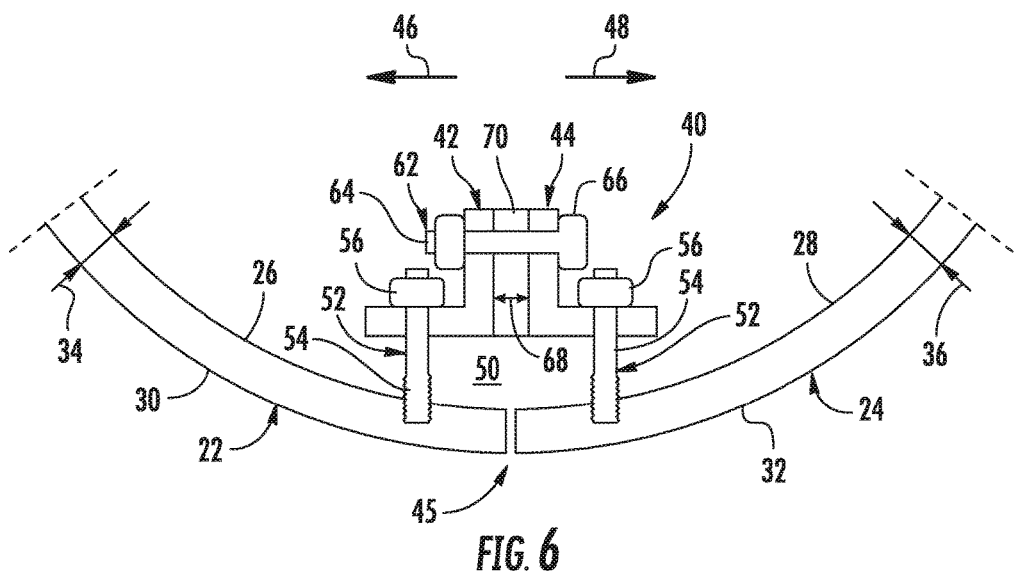
FIG. 6 illustrates a top view of one embodiment of a joint assembly according to the present disclosure, particularly illustrating a joint assembly having a spacer bar.

The first and second L-flanges 42, 44 may mounted to the interior walls 26, 28 of the first and second vertical tower sections 22, 24 using any suitable means. For example, as shown in FIGS. 3 and 6, the first and second L-flanges 42, 44 may mounted to the interior walls 26, 28 of the first and second vertical tower sections 22, 24 via one or more first fasteners 52 that extend from the first and second L-flanges 42, 44 into the open space 50 and through at least a portion of the thicknesses 34, 36 of the first and second vertical tower sections 22, 24, respectively. Alternatively, the first and second L-flanges 42, 44 may mounted to the interior walls 26, 28 of the first and second vertical tower sections 22, 24 by welding the first fasteners 52 to the first and second vertical tower sections 22, 24, respectively. As such, the joint assembly 40 of the present disclosure eliminates the need for continuous major welding along the vertical joint location 45, thereby reducing welding distortion and mitigating field fit-up issues. More specifically, as shown, the first fasteners 52 may include a threaded stud 54 secured to the first and second L-flanges 42, 44 with a maintenance-free nut 56 secured to the threaded stud 54. For example, in certain embodiments, the threaded studs 54 may be secured to the first and second L-flanges 42, 44 via welding, fasteners, adhesive, or similar.

Figure 4:
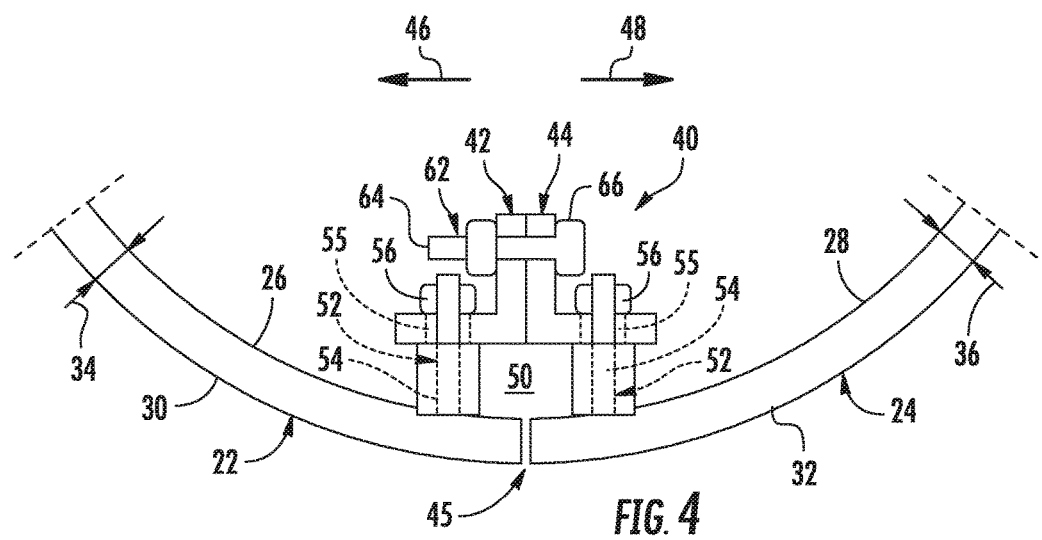
FIG. 4 illustrates a top view of another embodiment of a joint assembly according to the present disclosure.
Figure 5:
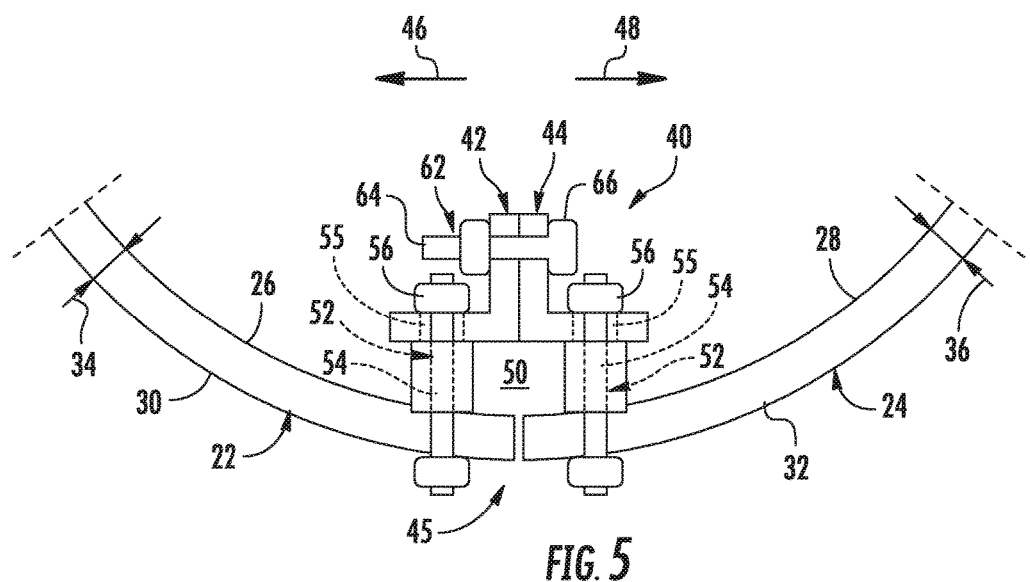
FIG. 5 illustrates a top view of yet another embodiment of a joint assembly according to the present disclosure.
Figure 7:
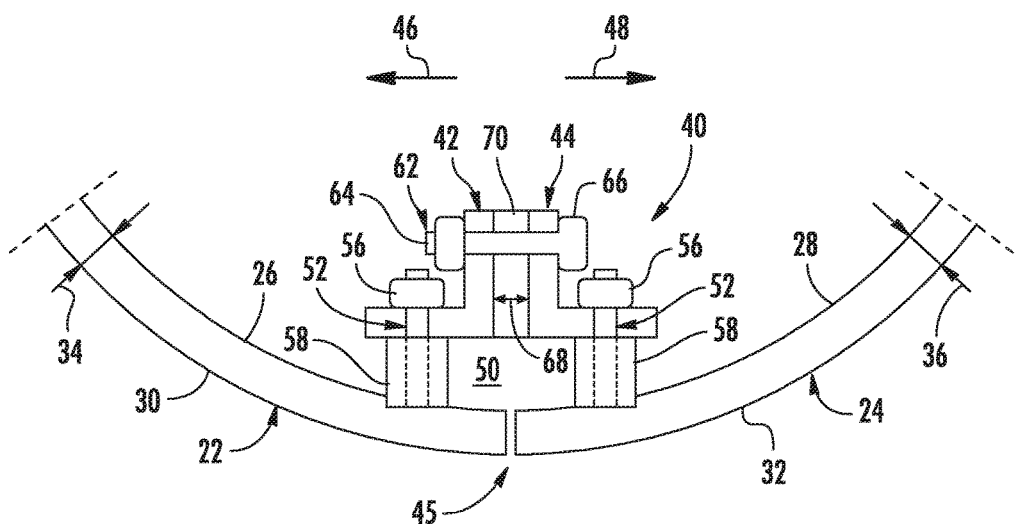
FIG. 7 illustrates a top view of another embodiment of a joint assembly according to the present disclosure, particularly illustrating a joint assembly having a spacer bar.
Figure 8:
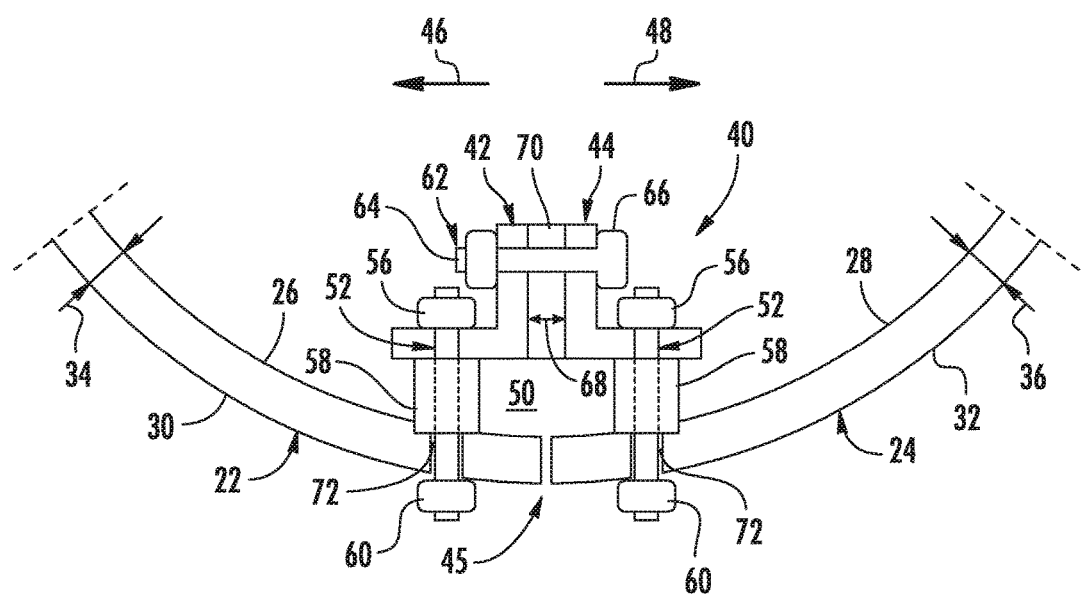
FIG. 8 illustrates a top view of yet another embodiment of a joint assembly according to the present disclosure, particularly illustrating a joint assembly having a spacer bar.

In further embodiments, as shown in FIGS. 4, 5, 7, and 8, the joint assembly 40 may further include a bushing 58 configured with each of the one or more first fasteners 52 in the open space 50. More specifically, as shown in FIGS. 4 and 6, each of the first fasteners 52 may extend through the bushings 58 and through a portion of the thicknesses 34, 36 of the first and second vertical tower sections 22, 24, respectively. As such, the threaded studs 54 can be secured into the first and second vertical tower sections 22, 24, e.g. via threading the studs 54 into the first and second vertical tower sections 22, 24 or via welding. Alternatively, as shown in FIGS. 5 and 8, each of the first fasteners 52 may extend through the bushings 58 and the entire thicknesses 34, 36 of the first and second vertical tower sections 22, 24, respectively. In such embodiments, through holes 72 may be provided (e.g. via machining) through the first and second vertical tower sections 22, 24, respectively, such that the threaded studs 54 can be easily inserted therethrough. In addition, the threaded studs 54 may be further secured to the first and second vertical tower sections 22, 24 via a maintenance-free nut 60 configured with the exterior walls 30, 32 of the first and second vertical tower sections 22, 24.

Referring generally to FIGS. 3-8, the first and second L-flanges 42, 44 may be secured or joined to each other via one or more second fasteners 62. More specifically, as shown, each of the second fasteners 62 may include a maintenance-free bolt 64 configured with a maintenance-free nut 66. As used herein, the maintenance-free bolts 64 and/or nuts 56, 60, 66 generally refer to nuts or bolts that do not require continuous torqueing thereof. In certain embodiments, for example, the maintenance-free bolts 64 and/or nuts 56, 60, 66 as described herein may encompass Bobtail® fasteners.

In addition, as shown in FIGS. 3-5, the first and second L-flanges 42, 44 may be arranged in a back-to-back relationship such that the flanges 42, 44 abut up against each other. Further, as shown, the first and second L-flanges 42, 44 may each include a slotted opening 55 configured to receive the fasteners 52 therethrough. As such, the slotted openings 55 allow for adjusting the circumferential position of each of the L-flanges 42, 44 with respect to each other. In addition, the slotted openings 55 allow for mating of the L-flanges 42, 44, i.e. without requiring a space therebetween. As such, the slotted openings 55 allow for a joint assembly that is less sensitive to manufacturing variations. In other words, the slotted openings 55 provide sufficient freedom to manipulate the L-flanges 42, 44 such that the flanges 42, 44 are not required to be installed completely symmetrical.

Alternatively, as shown in FIGS. 6-8, the first and second L-flanges 42, 44 may be arranged in a spaced apart relationship so as to define a vertical gap 68 therebetween. In such embodiments, as shown, the joint assembly 40 may further include a filler or spacer plate 70 configured within the vertical gap 68. The filler plate 70 as described herein generally refers to an elongated plate sandwiched between the first and second L-flanges 42, 44. As such, the filler plate 70 may be formed of a material that is configured to compress as the first and second L-flanges 42, 44 are secured together. Such a plate 70 prevents the like materials of the first and second L-flanges 42, 44 from rubbing against each other and therefore becoming worn.

Figure 9:
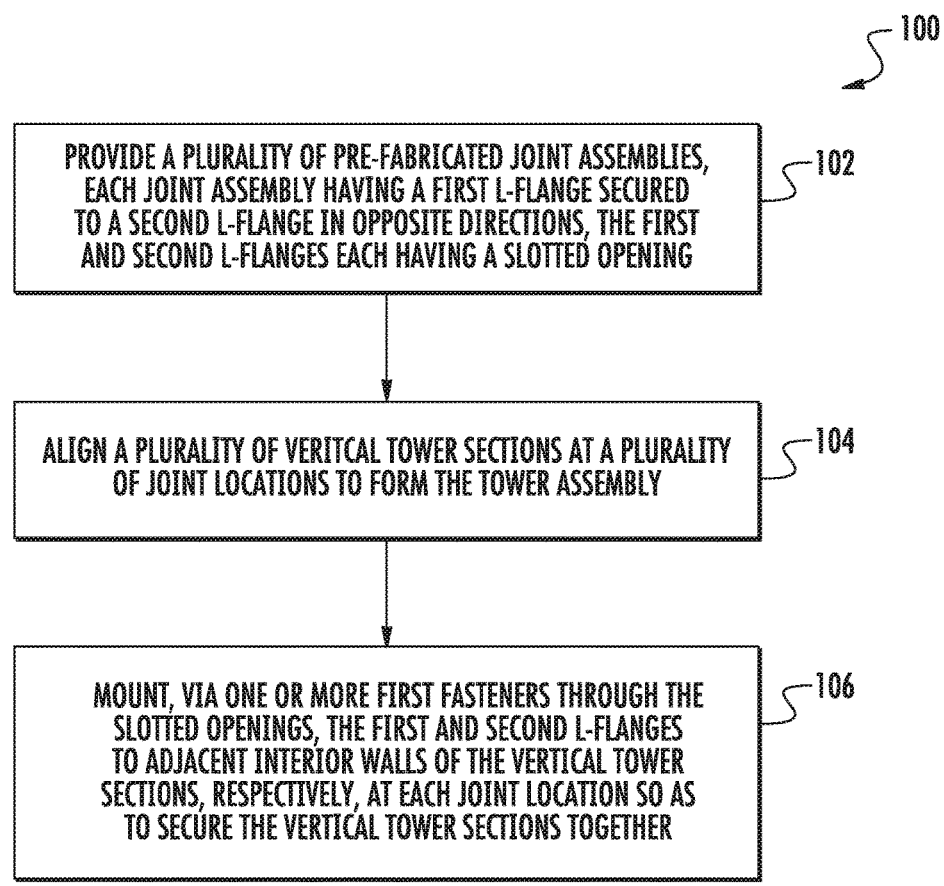
FIG. 9 illustrates a flow diagram of one embodiment of a method for forming a tower assembly of a wind turbine according to the present disclosure.

Referring now to FIG. 9, the present disclosure is further directed to a method 100 for forming a tower assembly 12 of a wind turbine 10. As shown at 102, the method 100 includes providing a plurality of pre-fabricated joint assemblies 40, with each joint assembly 40 having a first L-flange 42 secured to a second L-flange 44 in opposite directions. Further, as mentioned, the first and second L-flanges 42, 44 each having a slotted opening 55. As shown at 104, the method 100 includes aligning a plurality of vertical tower sections 22, 24 at a plurality of joint locations 45 to form the tower assembly 12. As shown at 106, the method 100 includes mounting, via one or more first fasteners 52 through the slotted openings 55, the first and second L-flanges 42, 44 to adjacent interior walls 26, 28 of the vertical tower sections 22, 24, respectively, at each joint location 45 so as to secure the vertical tower sections 22, 24 together. Optionally, the first and second L-flanges 42, 44 may also define an open space 50 with the interior walls 26, 28 of the vertical tower sections 22, 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower assembly for a wind turbine, comprising: at least one generally cylindrical tower section, the tower section being split into at least a first vertical tower section and a second vertical tower section, each of the first and second vertical tower sections defining an interior wall and an exterior wall separated by a thickness; a joint assembly securing the first and second vertical tower sections together, the joint assembly comprising: a first L-flange mounted to the interior wall of the first vertical tower section, the first L-flange facing in a first direction; and, a second L-flange mounted to the interior wall of the second vertical tower section, the second L-flange facing away from the first direction, the first and second L-flanges separated from the interior walls of the first and second vertical tower sections via an open space;

wherein the first and second L-flanges are mounted to the interior walls of the first and second vertical tower sections via one or more first fasteners that extend from the first and second L-flanges into the open space and through at least a portion of the thicknesses of the first and second vertical tower sections, respectively.

2. The tower assembly of claim 1, wherein the first and second L-flanges each comprise a slotted opening configured to receive the one or more first fasteners, the slotted openings configured to allow for adjusting a circumferential position of the L-flanges.

3. The tower assembly of claim 1, wherein each of the one or more first fasteners comprises a threaded stud welded to the first and second L-flanges and a maintenance-free nut secured to the threaded stud.

4. The tower assembly of claim 1, wherein the joint assembly further comprises a bushing configured with each of the one or more first fasteners in the open space.

5. The tower assembly of claim 1, wherein the first and second L-flanges are joined to each other via one or more second fasteners.

6. The tower assembly of claim 5, wherein each of the one or more second fasteners comprises a maintenance-free bolt and a maintenance-free nut.

7. The tower assembly of claim 1, further comprising a plurality of tower sections stacked end-to-end atop one another and coupled together to form the tower.

8. The tower assembly of claim 7, wherein each of the plurality of tower sections comprises at least one flange configured to couple to an adjacent tower section.

* * * * *